United States Patent
Madigan et al.

(10) Patent No.: US 12,437,340 B1
(45) Date of Patent: *Oct. 7, 2025

(54) TESTING AUTONOMOUS CARS

(71) Applicant: Allstate Insurance Company, Northbrook, IL (US)

(72) Inventors: Regina Madigan, Mountain View, CA (US); William F. Polisson, Vernon Hills, IL (US); Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 1277 days.

This patent is subject to a terminal disclaimer.

(21) Appl. No.: 17/164,175

(22) Filed: Feb. 1, 2021

Related U.S. Application Data

(63) Continuation of application No. 15/433,166, filed on Feb. 15, 2017, now Pat. No. 10,909,629.

(60) Provisional application No. 62/295,295, filed on Feb. 15, 2016.

(51) Int. Cl.
| | | |
|---|---|---|
| *G06Q 40/08* | (2012.01) | |
| *B60R 16/023* | (2006.01) | |
| *G05D 1/00* | (2006.01) | |
| *G07C 5/00* | (2006.01) | |
| *G07C 5/08* | (2006.01) | |

(52) U.S. Cl.
CPC ......... *G06Q 40/08* (2013.01); *B60R 16/0232* (2013.01); *G05D 1/0088* (2013.01); *G07C 5/008* (2013.01); *G07C 5/0808* (2013.01)

(58) Field of Classification Search
CPC ...... G06Q 40/08; G01M 17/00; B60W 60/00; B60W 30/09
See application file for complete search history.

(56) References Cited

U.S. PATENT DOCUMENTS

| | | |
|---|---|---|
| 9,940,676 B1 | 4/2018 | Biemer |
| 10,089,693 B1 | 10/2018 | Konrardy et al. |
| 10,185,998 B1 | 1/2019 | Konrardy et al. |
| 10,319,039 B1 * | 6/2019 | Konrardy ............... G06Q 40/08 |
| 2015/0170287 A1 | 6/2015 | Tirone et al. |

(Continued)

OTHER PUBLICATIONS

Mar. 7, 2019—U.S. Non-Final Office Action—U.S. Appl. No. 15/433,166.

(Continued)

*Primary Examiner* — Hao Fu

(57) ABSTRACT

Systems and methods are disclosed for determining the efficacy of an autonomous vehicle driving system in exhibiting safe driving behavior during test track scenarios. Testing parameters eliciting autonomous vehicle driving system behavior may be chosen for the test track scenario. The autonomous vehicle driving system may be tested in the test track and autonomous vehicle driving system behavior may be observed in response to the presentations of testing parameters. A safe driving score may be calculated for the autonomous vehicle driving system based on measured autonomous vehicle performance and operational data generated responsive to the presentation of testing parameters in the test track. A benchmark insurance premium may be calculated for an autonomous vehicle driving system based on the calculated safe driving score.

16 Claims, 7 Drawing Sheets

(56) References Cited

U.S. PATENT DOCUMENTS

2015/0187019 A1    7/2015  Fernandes et al.
2018/0164825 A1*   6/2018  Matus .............. B60W 50/0098

OTHER PUBLICATIONS

Nov. 18, 2019—U.S. Final Office Action—U.S. Appl. No. 15/433,166.
Sep. 24, 2020—U.S. Notice of Allowance—U.S. Appl. No. 15/433,166.
Hevelke, A., & Nida-Rumelin, J. (2015). Responsibility for Crashes of Autonomous Vehicles: an Ethical Analysis. Science & Engineering Ethics, 21(3), 619, (Year: 2015).
Jan. 6, 2021—U.S. Notice of Allowance—U.S. Appl. No. 15/433,166.

* cited by examiner

TESTING AUTONOMOUS CARS

CROSS-REFERENCE TO RELATED APPLICATIONS

This application is a continuation of and claims priority to U.S. patent application Ser. No. 15/433,166, now U.S. Pat. No. 10,909,629, filed Feb. 15, 2017, and entitled Testing Autonomous Cars," which claims prior priority to U.S. Provisional Patent Application No. 62/295,295, filed Feb. 15, 2016, and entitled "Testing Autonomous Cars," the content of each of which is incorporated herein by reference in its entirety.

FIELD

Aspects described herein are generally related to testing autonomous cars. More specifically, aspects described herein determine a driving score for autonomous cars and vehicles for the purposes of underwriting vehicle insurance.

BACKGROUND

Autonomous cars will need insurance. However, methods and systems for determining insurance rates associated with autonomous cars are unknown.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a platform for testing software infrastructure of an autonomous vehicle driving system in a virtual test track. Fake vehicle sensor input data may be determined in order to test autonomous vehicle driving system software under any of a plurality of potential live-driving scenarios. The autonomous vehicle driving system may be presented with the fake sensor input data in the virtual test track and autonomous vehicle performance and/or operational data associated with responses of the autonomous vehicle driving system are observed. Using the fake vehicle sensor input data and observed autonomous vehicle performance and/or operational data, a safe driving score may be calculated. After virtual test track testing is completed and a safe driving score is determined, a benchmark insurance premium and/or deductible may be determined.

A second aspect described herein provides for testing hardware and software responses of an autonomous vehicle driving system in a closed test track. Controllable and variable components may be determined in order to test an autonomous vehicle driving system under any of a plurality of live-driving scenarios. The autonomous vehicle driving system may be presented with the controllable and variable components in the closed test track and autonomous vehicle performance and/or operational data associated with responses of the autonomous vehicle driving system are observed. Using the controllable and variable components and observed autonomous vehicle performance and/or operational data, a safe driving score may be calculated. After closed test track testing is completed and a safe driving score is determined, a benchmark insurance premium and/or deductible may be determined. Such a benchmark insurance premium and/or deductible may take the safe driving score and/or benchmark insurance premium and/or deductible calculated in the first aspect into consideration.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
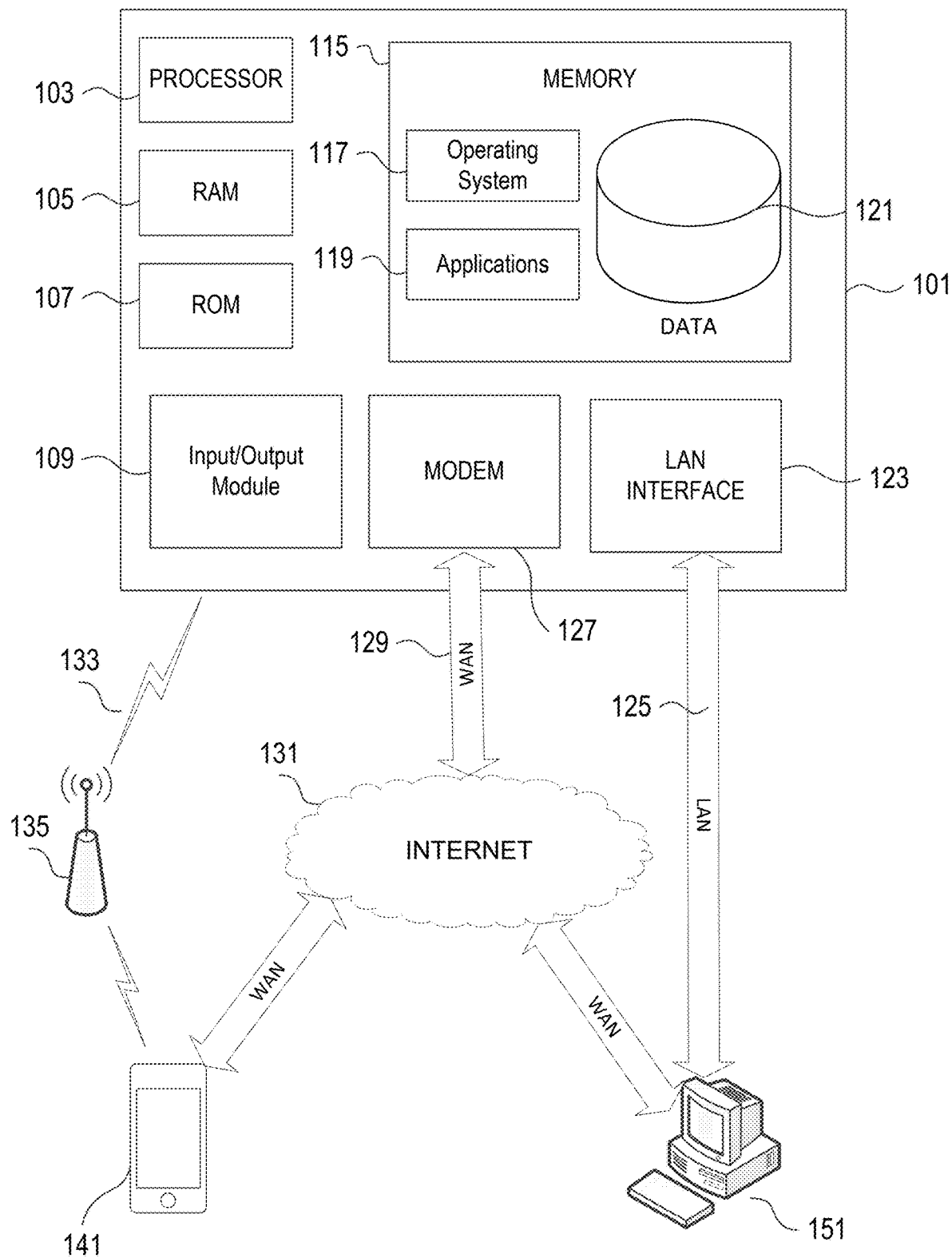
FIG. 1 illustrates a network environment and computing systems that may be used to implement aspects of the disclosure.

FIG. 1 illustrates a block diagram of a computing device 101 in driving analysis communication system 100 that may be used according to one or more illustrative embodiments of the disclosure. The driving analysis device 101 may have a processor 103 for controlling overall operation of the device 101 and its associated components, including RAM 105, ROM 107, input/output module 109, and memory unit 115. The computing device 101, along with one or more additional devices (e.g., terminals 141, 151) may correspond to any of multiple systems or devices, such as driving analysis computing devices or systems, configured as described herein for transmitting and receiving vehicle operational data, analyzing vehicle operational data, determining a safe driving score based on the analysis of the vehicle operational data, and determining various properties related to vehicle insurance based on the safe driving score. Vehicle operational data can include data collected from vehicle sensors, autonomous vehicle driving systems, and OBD systems. Vehicle operations can also include data pertaining to the driving of a vehicle and/or the driver of a vehicle. As used herein, vehicle performance and/or operational data may be used interchangeably with operation data and driving data.

Input/output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the driving analysis system 101 to execute a series of computer-readable instructions to transmit or receive vehicle driving data, analyze driving data, determine a safe driving score based on the driving data, and determine properties of, for example, insurance policies based on the driving data.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving data analysis programs, safe driving score algorithms, and driving and insurance policy properties algorithms) for transmitting and receiving vehicle driving data, determining safe driving scores, and determining various properties associated with one or more vehicles or drivers, and performing other related functions as described herein.

A safe driving score may refer to a number indicative of the efficacy and/or safety of a vehicle, as observed over a defined time period under certain environmental conditions, in demonstrating safe driving behavior to mitigate the potential for an accident or filed claim. The defined time period and associated environmental conditions present in the defined time period may be, for example, a period of rainfall at night, a period of rainfall during the day, a period snowfall at night, a period of snowfall during the day, iced roads at night during rush hour, iced roads during the day at rush hour, and the like.

For example, after a period of rainfall at night, a high safe driving score associated with the period may indicate the usage of headlights and windshield wipers, gradual applied brake force and vehicle acceleration, and the like during the period of rainfall at night, whereas a low safe driving score may indicate the absence of headlights and windshield wiper usage, sporadic breaking, and high levels of vehicle acceleration during the period of rainfall at night. Such a safe driving score may serve as a marker of safe driving behavior, or lack thereof, under any given period and associated driving conditions. In certain instances, the safe driving score may be extrapolated over the totality of possible periods and associated conditions and serve as a measure of probability of an autonomous driving system and/or driver exhibiting safe driving behavior when presented with environmental conditions not previously encountered. Additionally, the safe driving score may serve as a measure of probability of an autonomous driving system and/or driver reproducing safe driving behavior when presented with previously encountered conditions.

In conventional driving scenarios (i.e., human driver operating a vehicle), vehicle performance and operational data provided by vehicle sensors, telematics device, mobile computing device, or the like may be graded to determine a safe driving score. As stated above, the generated safe driving score may serve as a marker representing safe driving behavior, wherein a high safe driving score is indicative of a safe driver, and a low safe driving score is indicative of a non-safe driver. Safe driving scores generated for human drivers may serve as a benchmark for comparison for safe driving scores generated for autonomous driving systems.

As described in further detail below with respect to FIGS. 5, 6, and 7, an autonomous vehicle driving system may be tested under virtual test track, closed test track, and live test track conditions in order to generate a safe driving score. The safe driving score generated for the autonomous vehicle driving system may be compared against a safe driving score of a human driver in order to generate an insurance premium and/or deductible for the autonomous driving system.

Figure 2:
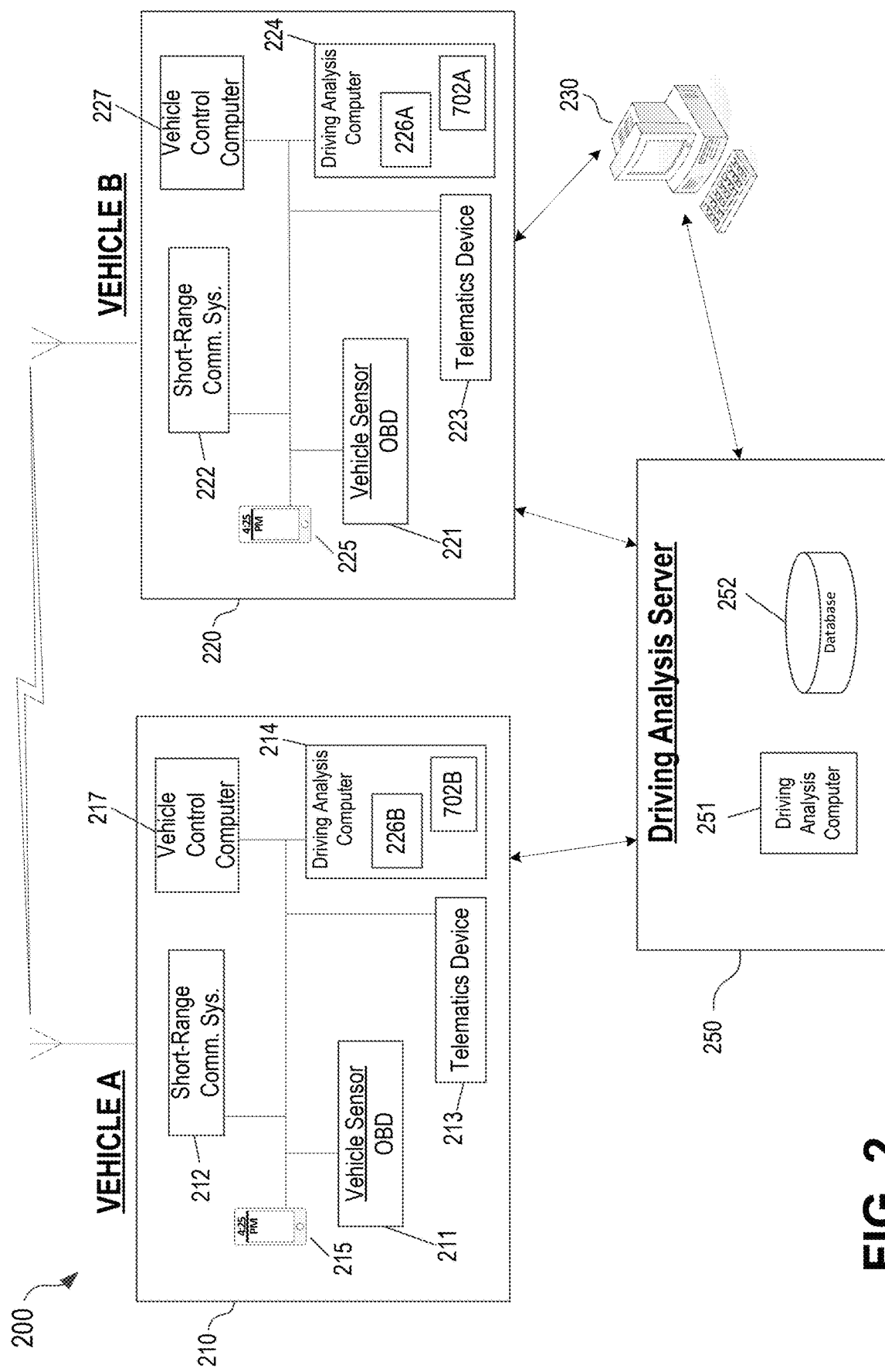
FIG. 2 is a diagram illustrating various example components of a driving analysis computing device according to one or more aspects of the disclosure.

FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which vehicle driving data may be collected and analyzed. Such vehicles may be autonomous or non-autonomous. Vehicles 210 and 220 may be of a similar type (e.g., autonomous automobiles, buses, or the like) or may be of a different type (i.e., vehicle 210 may be an autonomous automobile and vehicle 220 may be a non-autonomous automobile). In some instances, while not explicitly shown, vehicles 210 and 220 may be one a plurality of vehicles (i.e., vehicle 210a, 210b, . . . , 210n). In other instances, vehicles 210 and 220 may serve as a statistical average representation of the totality of vehicles of a certain similar type.

The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure.

Vehicle sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle, etc.). Vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, lane position, road-type (e.g. highway, entrance/exit ramp, residential area, etc.) and other vehicle position/location data. Vehicles 210 and 220 may include other vehicle sensors 211 and 221 for monitoring other vehicle performance and operational phenomena, as well as other internal and external phenomena.

The data collected by vehicle sensors 211 and 221 may be stored and/or analyzed within the respective vehicles 210 and 220, such as for example a driving analysis computer 214, 224 integrated into the vehicle, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle performance and operational data to other nearby vehicles, and to receive vehicle performance and operational data from other nearby vehicles. In some examples, communication systems 212 and 222 may use the dedicated short-range communications (DSRC) protocols and standards to perform wireless communications between vehicles. In the United States, 75 MHz in the 5.850-5.925

GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., vehicle spacing, yielding, defensive avoidance, proper response to a safety hazard, etc.) and driving conditions (e.g., congestion).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, the autonomous driving system, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driver scores, etc.) may be collected from other data sources, such as a driver's or passenger's mobile device 215 or 225, driving analysis server 250, and/or another external computer system 230, and transmitted using V2V communications to nearby vehicles and other transmitting and receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle performance and operational data from vehicle sensors 211 and 221, and may transmit the data to one or more external computer systems (e.g., driving analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221 or system, such as an autonomous driving system. The telematics devices 213 and 223 also may store the type of their respective vehicles 210 and 220, for example, the make, model, trim (or sub-model), year, and/or engine specifications, autonomous driving system specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to a driving analysis server 250. However, in other examples, one or more of the vehicle sensors 211 and 221 or systems, including autonomous driving systems, may be configured to receive and transmit data directly from, or to, a driving analysis server 250 without using a telematics device. For instance, telematics devices 213 and 223 may be configured to receive and transmit data from certain vehicle sensors 211 and 221 or systems, while other sensors or systems may be configured to directly receive and/or transmit data to a driving analysis server 250 without using the telematics device. Thus, telematics devices 213 and 223 may be optional in certain embodiments.

In certain embodiments, vehicle sensors, vehicle OBD, autonomous driving systems, and/or vehicle communication systems, may collect and/or transmit data pertaining to vehicle performance and operation as well as immediate environmental conditions. Such collection and transmission techniques may be performed for autonomous and conventional vehicles.

In conventional vehicles, a driver controls various aspects related to the functionality of the vehicle. A conventional vehicle may also be referred to as a standard vehicle, driver-controlled vehicle, non-autonomous vehicle, and the like. In such a vehicle, sensors 211 and 221 may actively collect and transmit vehicle performance and operation data to telematics devices 213 and 223, driving analysis computers 214 and 224, vehicle control computers 217 and 227, and/or driving analysis server 250. As compared to an autonomous vehicle, vehicle control computers 217 and 227 do not directly control the totality of aspects of vehicle driving. In some instances, vehicle control computers 217 and 227 have limited ability to intervene in operation of vehicles 210 and 220 (i.e., parallel parking, emergency breaking in response to sensor proximity data, and the like).

In autonomous driving, the vehicle fulfills all or part of the driving without being piloted by a human. An autonomous car can be also referred to as a driverless car, self-driving car, or robot car. In such a vehicle, sensors 211 and 221 may actively collect and transmit vehicle performance and operation data to telematics devices 213 and 223, driving analysis computers 214 and 224, vehicle control computers 217 and 227, autonomous vehicle driving systems, and/or driving analysis server 250. As compared to a non-autonomous vehicle, vehicle control computer 217, 227 may be configured to operate all or some aspects of the vehicle driving, including but not limited to acceleration, braking, steering, and/or route navigation. In some instances, vehicle control computers 217 and 227 may entail, in part, an autonomous vehicle driving system. Other vehicle components including sensors 211 and 221 may be additionally be comprised within an autonomous vehicle driving system. Alternatively, an autonomous vehicle driving system may operate in tandem with vehicle sensors 211 and 221 and vehicle control computers 217 and 227. A vehicle with an autonomous driving capability may sense its surroundings using the vehicle sensors 211, 221 and/or receive inputs regarding control of the vehicle from the vehicle communications systems, including but not limited to short range communication systems 212, 222 Telematics 213, 223 or other vehicle communication systems.

In certain embodiments, mobile computing devices 215 and 225 within the vehicles 210 and 220 may be used to collect vehicle driving data and/or to receive vehicle driving data from vehicle communication systems and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210, 220. Software applications executing on mobile devices 215, 225 may be configured to detect certain driving data independently and/or may communicate with vehicle sensors 211, 221, Telematics 213, 223, autonomous driving systems, or other vehicle communication systems to receive additional driving data. For example, mobile devices 215, 225 equipped with GPS functionality may determine vehicle location, speed, direction and other basic driving data without needing to communicate with the vehicle sensors 211 or 221, or any vehicle system. In other examples, software on the mobile devices 215, 225 may be configured to receive some or all of the driving data collected by vehicle sensors 211, 221. Mobile computing devices 215 and 225 may also be involved with aspects of autonomous driving, including receiving, collecting, and transmitting vehicle operational data regarding autonomous driving and autonomous driving relationships between multiple vehicles.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with, or instead of, short-range communication systems 212 and 222 in some examples. In addition, mobile computing devices 215 and 225 may be used in conjunction with the vehicle control computers 217 and 227 and/or autonomous vehicle driving systems for purposes of autonomous driving. Moreover, the processing components of the mobile computing devices 215 and 225 may be used to analyze vehicle driving data, determine a safe driving score, determine properties related to aspects of a vehicle insurance policy, and perform other related functions. Therefore, in certain embodiments, mobile computing devices 215 and 225 may be used in conjunction with, or in place of, the driving analysis computers 214 and 224.

Vehicles 210 and 220 may include driving analysis computers 214 and 224, which may be separate computing devices or may be integrated into one or more other components within the vehicles 210 and 220, such as the short-range communication systems 212 and 222, telematics devices 213 and 223, autonomous driving systems, or the internal computing systems of vehicles 210 and 220. As discussed above, driving analysis computers 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis computers 214 and 224 may contain some or all of the hardware/software components as the computing device 101 depicted in FIG. 1. Further, in certain implementations, the functionality of the driving analysis computers, such as storing and analyzing vehicle driving data, determining a safe driving score, and determining aspects of insurance polies, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis computers 214 and 224 may be optional.

Driving analysis computers 214 and 224 may be implemented in hardware and/or software and configured to receive vehicle driving data from vehicle sensors 211 and 221, short-range communication systems 212 and 222, telematics devices 213 and 223, vehicle control computer 217 and 227, autonomous vehicle driving systems, and/or other driving data sources. Vehicle sensors/OBDs 211 and 221, short-range communication systems 212 and 222, telematics devices 213 and 223, vehicle control computer 217 and 227, autonomous vehicle driving systems, and/or other driving data sources can be referred to herein individually or collectively as a vehicle data acquiring component. The driving analysis computer 214, 224 may comprise an electronic receiver to interface with the vehicle data acquiring components to receive the collected data. After receiving, via the electronic receiver, the vehicle driving data from, for example, a vehicle data acquiring component, the driving analysis computers 214 and 224 may perform a set of functions to analyze the driving data, determine a safe driving score, and determine properties related to vehicle insurance. For example, the driving analysis computers 214 and 224 may include one or more a safe driving scoring algorithms, which may be executed by software running on generic or specialized hardware within the driving analysis computers. The driving analysis computer 214 in a first vehicle 210 may use the vehicle driving data received from that vehicle's sensors 211, along with vehicle driving data for other nearby vehicles received via the short-range communication system 212, to determine a safe driving score and determine properties related to vehicle insurance applicable to the first vehicle 210 and the other nearby vehicles. Alternatively, driving analysis computers 214 and 224 may calculate a safe driving score based on vehicle driving data from the vehicle data acquiring component of the respective vehicle 210 or 220, request a benchmark safe driving score from driving analysis server 250, and determine properties related to vehicle insurance based on a comparison of the calculated safe driving score and the benchmark safe driving score. Within the driving analysis computer 214, a vehicle insurance property function may use the safe driving score calculated or generated by the computer 214 to determine/adjust a property of an insurance policy associated with the vehicle 210 and/or a driver of a vehicle 210. Further descriptions and examples of the algorithms, functions, and analyses that may be executed by the driving analysis computers 214 and 224 are described below, including in reference to FIGS. 3, 4, and 5.

The system 200 also may include a driving analysis server 250, containing some or all of the hardware/software components as the computing device 101 depicted in FIG. 1. The driving analysis server 250 may include hardware, software, and network components to receive vehicle operational data/driving data from one or more vehicles 210 and 220, and other data sources. The driving analysis server 250 may include a driving data and driver data database 252 and driving analysis computer 251 to respectively store and analyze driving data received from vehicles and other data sources. The driving analysis server 250 may initiate communication with and/or retrieve driving data from vehicles 210 and 220 wirelessly via telematics devices 213 and 223, driving analysis computers 214 and 215, mobile devices 215 and 225, vehicle control computers 217 and 227, autonomous vehicle driving systems, or by way of separate computing systems (e.g., computer 230) over one or more computer networks (e.g., the Internet). Additionally, the driving analysis server 250 may receive additional data from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the driving data database 252 may be organized in any of several different manners. For example, a table in database 252 may contain all of the vehicle operation data for a specific vehicle 210, similar to a vehicle event log. Other tables in the database 252 may store vehicle operation data for multiple vehicles (i.e., vehicle 210a, 210b, . . . , 210n). Additionally, other types of data may be stored in database 252. For instance, tables may store specific data sets, including data types discussed above (e.g. road-type information, insurance data, etc.). In certain instances, properties associated with vehicle insurance may be stored in database 252. Such data associated vehicle insurance may be stored for a specific vehicle 210 or 220, or for multiple vehicles (i.e., vehicle 220a, 220b, . . . , 220n).

The driving analysis computer 251 within the driving analysis server 250 may be configured to retrieve data from the database 252, or may receive driving data directly from vehicles 210 and 220 or other data sources, and may perform driving data analyses, determine safe driving scores, and/or vehicle insurance determinations, and other related functions. The functions performed by the driving analysis computer 251 may be similar to those of driving analysis computers 214 and 224, and further descriptions and examples of the algorithms, functions, and analyses that may be executed by the driving analysis computer 251 are described below in reference to FIGS. 5, 6, and 7.

In various examples, the driving data analyses, safe driving score determinations, and/or insurance property determinations may be performed entirely in the driving analysis computer 251 of the driving analysis server 250 (in which case driving analysis computers 214 and 224 need not be implemented in vehicles 210 and 220), or may be performed entirely in the vehicle-based driving analysis computers 214 and 224 (in which case the driving analysis computer 251 and/or the driving analysis server 250 need not be implemented). In other examples, certain driving data analyses may be performed by vehicle-based driving analysis computers 214 and 224, while other driving data analyses are performed by the driving analysis computer 251 at the driving analysis server 250. For example, a vehicle-based driving analysis computer 214 may continuously receive and analyze driving data from vehicle 210, or nearby vehicles 220a, 220b, . . . , 220n to determine certain aspects of the safe driving score so that large amounts of driving data need not be transmitted to the driving analysis server 250. However, for example, after a safe driving score is determined by the vehicle-based driving analysis computer 214, the information may be transmitted to the server 250, and the driving analysis computer 251 may determine if a property of the insurance policy should be updated.

In some instances, driving analysis server 250 may be configured to utilize the data generated by a vehicle in the testing manner described below in order to generate an ultra-high resolution risk map. Such a risk map may graphically render the relative risk associated with any given driving scenario on any given roadway in either two or three dimensions. The relative risk data included in the risk map may serve as a marker of how a vehicle is likely to perform under any of a plurality of driving scenarios and the probability of incurring an accident under any given scenario. For example, the risk map may display a higher indication of risk when a vehicle is driving down a flooded street with potholes as compared to driving down the same street unflooded.

Figure 3:
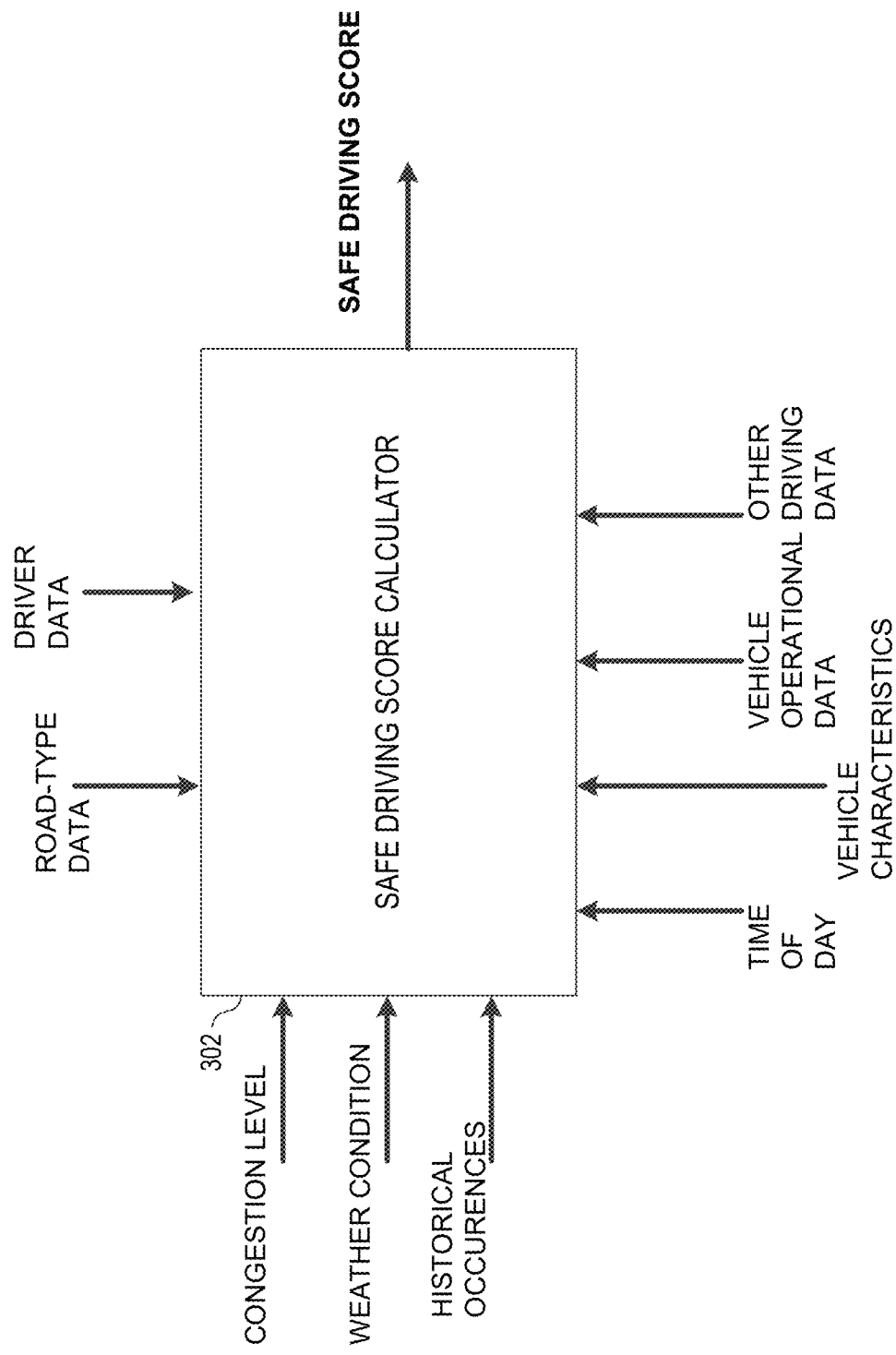
FIG. 3 is a diagram illustrating one example of a vehicle safe driving score calculator according to one or more aspects of the disclosure.

FIG. 3 is a diagram illustrating an example of a safe driving score calculator for a conventional human operated vehicle The safe driving score calculations performed in accordance with the variable inputs depicted by FIG. 3 may be performed by one or more computing devices in a driving analysis system, such as telematics devices 213 and 223, driving analysis computers 214 and 224, mobile devices 215 and 225, vehicle control computers 217 and 227, driving analysis server 250, and/or external computing device 230. In some instances, the one or more computing devices may perform the safe driving score calculations in a piecemeal manner. For example, telematics devices 213 and 223 may perform an initial calculation, driving analysis computers 214 and 224 may perform an intermediary calculation, and driving analysis server 250 may perform a final calculation in determining the safe driving score. Other combinations and amounts of computing devices as described herein may perform such calculations. Additionally, in the case of determining a safe driving score for an autonomous vehicle driving system, the autonomous vehicle driving system itself may perform the necessary calculations in whole, or in part.

As shown in FIG. 3, a safe driving score calculator 302 may determine a safe driving score for a driver using a plurality of variable inputs including driver data, road-type data, congestion levels, weather conditions, historical accident and claim filing occurrences, time of day, vehicle characteristics, vehicle operational data, and other driving data. In some embodiments, any combination of the shown input variables may be used. Alternatively, additional input variables may be used alone, or in combination with the input variables shown in FIG. 3.

Driver data may include an age of the driver associated with the insurance policy of the vehicle, driving history of the driver (i.e., number of accidents, traffic violations, and the like), and/or GPA of a driver in high school or university. In some instances, driver data may further include previous safe driving scores associated with the driver. Such data items may be entered alone, or in combination, into the safe driving score calculator in calculating a safe driving score.

Road-type data may include information of the type and/or quality of road on which the driver of vehicle 210 or 220 is currently driving. For example, road-type data may signify that a driver is driving on a bridge with metal grating, a bridge with concrete paneling, a gravel or dirt road, a road with a propensity to incur heavy icing under certain weather conditions, a road with significant curvature, and/or a road situated in a stimulating/distracting environment (i.e., Lombard St in San Francisco, Las Vegas Blvd "The Strip" in Las Vegas, Bourbon St. in New Orleans, and the like). Road-type data may include other information corresponding to the type of road. For instance, road-type data may further include whether the road is a one-way street, two lane highway, four lane highway, and the like. Additionally, the quality of road may be included in the road-type data. For instance, data concerning road quality may include reported pot holes, road work and/or construction, and road width, as well as other information. In some instances, the road-quality data may serve as an addendum and/or augmentation to the road-type (e.g., Bourbon St. in New Orleans with pot holes and construction) or may be considered as an independent variable.

Congestion level may include traffic information corresponding to a segment of roadway on which a driver of vehicle 210 or 220 is currently driving. In instances in which real-time congestion level data in unavailable, historic congestion level trends may be utilized. Additionally, congestion level data may include future congestion level information associated with a segment of road to be encountered by the driver of vehicle 210 or 220 as he or she progresses along a predetermined route.

Weather condition data may be real-time weather data associated with the immediate area relating to that of vehicle 210 or 220. In some embodiments, weather condition data may include further weather condition information associated with a segment of road to be encountered by the driver of vehicle 210 or 220 as he or she progresses along a predetermined route.

Historical occurrences data may provide information regarding insurance claims, accident reports, historical safe driving scores, and/or historical vehicle operation and performance data. Such historical occurrence data may be associated with driver, road-type, congestion level, weather condition, time of day, vehicle characteristics, vehicle operation and performance, and/or other driving data to provide historical context about safe driving behavior under previously documented circumstances. For example, historical occurrence data may show that on the 4th of July, at night, during the rain, on roadways with significant curvature, drivers of between the ages of 18-25 are more likely to get involved in accident. Such historical occurrence data may serve to provide a baseline further understanding a calculated safe driving score.

Time of day data may correspond to a current time at which the safe driving score is calculated. Alternatively, time of day may be associated with the time at which a segment of road will encountered by the driver of vehicle 210 or 220 as he or she progresses along a predetermined route.

Vehicle characteristics data may identify the make, model, trim (or sub-model), year, and/or engine and part specifications of a vehicle 210 or 220 associated with a driver and/or insurance plan.

As stated above, vehicle performance and operational data may include information provided by vehicle operation sensors 211 and 221 of vehicles 210 and 220. Vehicle performance and operational data may include data corresponding to the vehicle's location (e.g., GPS coordinates), speed and direction, rates of acceleration or braking, gas mileage, and specific instances of sudden acceleration, braking, swerving, and distance traveled. Vehicle performance and operational data provided by sensors 211 and 221 may also include data regarding the internal systems of a vehicle, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data.

Other driving data may entail additional data provided by sensors 211 and 221 including, for example, presence of other nearby vehicles, vehicle spacing, animals, cyclists, and pedestrians, as well as other conditions that may factor into the calculation of the safe driving score. In some instances, other driving data may include data relating to moving violations and the observance of traffic signals and signs by the vehicles 210 and 220. Additionally, sensors 211 and 221 may provide other driving data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure. In other instances, vehicles sensors 211 and 221 may provide other driving data regarding internal vehicle conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Moreover, sensors 211 and 221 also may be configured to provide other driving data concerning a driver's movements or the condition of a driver, such as the driver's eye position, head position, physical or mental state of the driver, such as fatigue or intoxication.

The safe driving score calculator 302 may factor in the input variables mentioned above to determine a safe driving score of a driver. The safe driving score may serve as a marker for a driver's safe driving habits. Based upon the safe driving score, an insurance plan, premium, and/or deductible may be calculated on a driver-by-driver basis. For example, a driver with a high safe driving score may pay a lower premium and/or deductible than a driver with a lower safe driving score. Such a calculated insurance premium may be fixed for a contracted length of time (i.e., 6 months, 1 year, or the like). Alternatively, the safe driving score calculator and safe driving score calculated therein may enable the implementation of variable insurance premiums and/or deductibles. For example, insured drivers may be required to pay a slightly higher deductible from one month to the next if their safe driving score reflects a worsening of safe driving habits. Similarly, insured drivers may pay a slightly lower premium and/or deductible from one month to the next if their safe driving score reflects an improvement in driving habits.

In certain instances, safe driving scores may be calculated in real-time by safe driving score calculator 302. In such cases, the real-time safe driving score may be used, by extension, to determine real-time fluctuating insurance premiums and/or deductibles. Such premiums and/or deductibles may be used, in some cases, to incentivize at risk drivers to stay off the road and/or cease vehicle operation. For example, if real-time safe driving scores indicate a high probability of incurring an accident, insurance premium credit may be offered to an insured driver to stay of the road. As another example, a real-time driving score may be calculated for a driver actively operating a vehicle during adverse driving conditions. In such instances, the driver may be presented with insurance premium credit to cease operation of the vehicle for a predetermined period of time.

Figure 4:
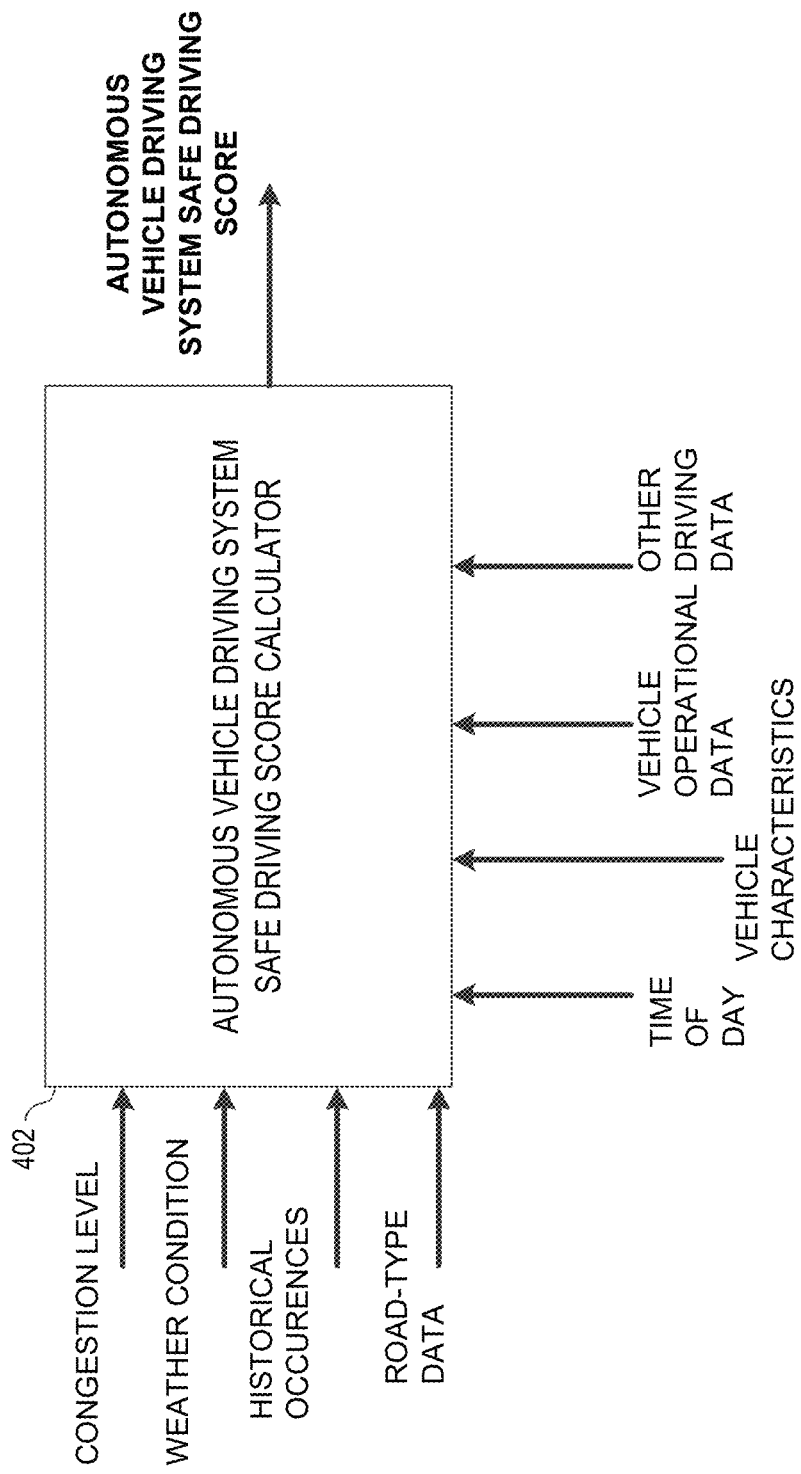
FIG. 4 is a diagram illustrating one example of an autonomous vehicle driving system safe driving score calculator according to one or more aspects of the disclosure.

FIG. 4 is a diagram illustrating an example of an autonomous vehicle driving system safe driving score calculator The safe driving score calculations performed in accordance with the variable inputs depicted by FIG. 4 may be performed by one or more computing devices in a driving analysis system, such as telematics devices 213 and 223, driving analysis computers 214 and 224, mobile devices 215 and 225, vehicle control computers 217 and 227, driving analysis server 250, and/or external computing device 230. In some instances, the one or more computing devices may perform the safe driving score calculations in a piecemeal manner. For example, telematics devices 213 and 223 may perform an initial calculation, driving analysis computers 214 and 224 may perform an intermediary calculation, and driving analysis server 250 may perform a final calculation in determining the safe driving score. Other combinations and amounts of computing devices as described herein may perform such calculations. Additionally, in the case of determining a safe driving score for an autonomous vehicle driving system, the autonomous vehicle driving system itself may perform the necessary calculations in whole, or in part.

As shown in FIG. 4, an autonomous vehicle driving system safe driving score calculator 402 may determine an autonomous vehicle driving system safe driving score for an autonomous vehicle driving system using a plurality of variable inputs including road-type data, congestion levels, weather conditions, historical accident and claim filing occurrences, time of day, vehicle characteristics, vehicle operational data, and other driving data. In some embodiments, any combination of the shown input variables may be used. Alternatively, additional input variables may be used alone, or in combination with the input variables shown in FIG. 4.

Road-type data may include information concerning the type and/or quality of road on which autonomous vehicle 210 or 220 is driving. For example, road-type data and/or quality may signify that an autonomous vehicle is driving on a bridge with metal grating, a bridge with concrete paneling, a gravel or dirt road with pot holes, a road with a propensity to incur heavy icing under certain weather conditions, a road with significant curvature and changing elevation, and/or a road that otherwise might affect the efficacy an autonomous vehicle driving system to yield safe driving results. An autonomous vehicle driving system may be shown to perform differently on varying road-types and/or road qualities and, ultimately, exhibit safe driving behavior to varying degrees depending on the road-type and/or road quality. In such instances where a road-type and/or road quality is shown to adversely affect the efficacy of an autonomous vehicle driving system in exhibiting safe driving behavior, autonomous vehicle driving system safe driving score calculator 402 may place additional emphasis on such an input variable in determining a safe driving score.

Congestion level may include traffic information corresponding to a segment of roadway on which an autonomous vehicle 210 or 220 is driving. Depending on the autonomous vehicle driving system operating the vehicle and/or sensors 211 and 221 used by autonomous vehicle 210 or 220 in performing autonomous driving functions, congestion levels may adversely impact an autonomous vehicle in displaying safe driving behavior. In such instances, autonomous vehicle driving system safe driving score calculator 402 may place additional weight on the congestion level input variable in determining a safe driving score.

In a similar manner to that described above in regards to road-type and congestion level variable input data, certain weather condition data may be shown to affect the safe driving performance of an autonomous vehicle driving system. In such instances where certain weather phenomena are observed to adversely impact the safe driving performance of an autonomous vehicle driving system, autonomous vehicle driving system safe driving score calculator 402 may place additional weight on the certain weather conditions that cause the autonomous vehicle driving system to perform unfavorably in determining a safe driving score.

Historical occurrences data may provide information regarding insurance claims, accident reports, historical safe driving scores, and/or historical vehicle operation and performance data associated with an autonomous vehicle driving system. Such historical occurrence data may associate an autonomous vehicle driving system with road-type, congestion level, weather condition, time of day, vehicle characteristics, vehicle operation and performance, and/or other driving data to provide historical context about safe driving behavior under previously documented circumstances. For example, historical occurrence data may show that an autonomous vehicle has a higher probability of getting involved in accident when operating in heavy traffic on a grated bridge on a snowy day. Such historical occurrence data may serve to provide a baseline for further understanding a calculated autonomous vehicle driving system safe driving score.

Time of day may correspond to a time for which the autonomous vehicle driving system safe driving score is calculated or a time at which the autonomous vehicle performance and operational data is generated. Alternatively, time of day may be associated with the time at which a segment of road will be encountered by the driver of vehicle 210 or 220 as he or she progresses along a predetermined route.

Vehicle characteristics data may identify the make, model, trim (or sub-model), year, and/or engine and part specifications of an autonomous vehicle 210 or 220 associated with an autonomous vehicle driving system. In certain embodiments, vehicle characteristics data may further identify the model and type of vehicle sensors 211 and 221 used in autonomous vehicle 210 or 220. In such instances where the model and type of vehicle sensors 211 and 221 causes deterioration of safe driving behavior, autonomous vehicle driving system safe driving score calculator 402 may place additional weight on the vehicle characteristics data in determining a safe driving score.

In some instances, the vehicle characteristics data may further include information corresponding to the installation, or lack thereof, of system updates to the autonomous vehicle driving system provided by the provider. For example, if updates for an autonomous vehicle driving system are made available, but are determined to not be installed on an autonomous vehicle driving system, vehicle characteristic data provided to autonomous vehicle driving system safe driving score calculator 402 may indicate that updates have not been installed. In such instances, autonomous vehicle driving system safe driving score calculator 402 may generate a safe driving score representative of the uninstalled update. Subsequently, depending on the importance of the uninstalled update, autonomous vehicle 210 or 220 may be rendered uninsurable.

Vehicle performance and operational data may include information provided by vehicle operation sensors 211 and 221 of autonomous vehicles 210 and 220. Vehicle performance and operational data may include data corresponding to the vehicle's location (e.g., GPS coordinates), speed and direction, rates of acceleration or braking, gas mileage, and specific instances of sudden acceleration, braking, swerving, and distance traveled. Vehicle performance and operational data provided by sensors 211 and 221 may also include data regarding the internal systems of a vehicle, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, physical maintenance performed on the vehicle, and other data.

Other driving data may entail additional data provided by sensors 211 and 221 including, for example, presence of other nearby vehicles, vehicle spacing, animals, cyclists, and pedestrians, as well as other conditions that may factor into the calculation of the safe driving score. In some instances, other driving data may include data relating to moving violations and the observance of traffic signals and signs by autonomous vehicles 210 and 220. Additionally, sensors 211 and 221 may provide other driving data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure. In other instances, vehicles sensors 211 and 221 may provide other driving data regarding internal vehicle conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle).

The autonomous vehicle driving system safe driving score calculator 402 may factor in the input variables mentioned above to determine a safe driving score of an autonomous vehicle driving system. The safe driving score may serve as a marker for the autonomous vehicle driving system's ability to exhibit safe driving habits. Based upon the safe driving score, an insurance plan, premium, and/or deductible may be calculated.

In certain embodiments, the insurance plan generated from the safe driving score associated with the autonomous vehicle driving system may provide liability coverage to one of the car owner, autonomous vehicle driving system software provider and/or developer, or autonomous vehicle manufacturer. In other embodiments, a percentage of total liability may be determined for each one of the car owner, autonomous vehicle driving system software provider and/or developer, or autonomous vehicle manufacturer based on the determined safe driving score. In such cases, the each party may responsible for their percentage of liability and, ultimately, require insurance coverage directed towards the respective percentage of liability.

In other embodiments, insurance plans may vary across autonomous vehicle driving systems from different software providers and/or developers depending on the safe driving score associated with the respective autonomous vehicle driving systems. For example, a first software provider and/or developer responsible for a first autonomous vehicle driving system with a high safe driving score may pay a lower premium and/or deductible than a second software provider and/or developer responsible for a second autonomous vehicle driving system with a lower safe driving score. In such embodiments, insurance plans associated with the safe driving scores of the autonomous vehicle driving systems of the respective software provider and/or developer may be determined on an autonomous vehicle fleet-by-fleet basis. For instance, in the example described above, the first software provider and/or developer responsible for the first autonomous vehicle driving system may be provided with a risk rating associated with the safe driving score of the first autonomous vehicle driving system. Such a risk rating may be extended to the totality of like-autonomous vehicles (i.e., autonomous vehicles of a same make and model) using the first autonomous vehicle driving system (i.e., a first fleet of like-autonomous vehicles using the first autonomous vehicle driving system). Insurance plans generated based on the safe driving score of the first autonomous vehicle driving system may be applied on a wholesale level to cover the entirety of the first fleet.

However, in instances where the first autonomous vehicle system is used in non-like autonomous vehicles (i.e., autonomous vehicles of different makes and models) and the safe driving score of the first autonomous vehicle system varies when used in the autonomous vehicles of different makes and models, a risk rating and/or insurance plan may not be generated covering the non-uniform fleet. In instances where the first autonomous vehicle system is used in non-like autonomous vehicles (i.e., autonomous vehicles of different makes and models) and the safe driving score of the first autonomous vehicle system does not vary, however, a risk rating and/or insurance plan may be generated covering the totality of vehicles in the non-uniform fleet.

In the embodiments described in further detail below with respect to FIG. 5, FIG. 6, and FIG. 7, the calculation of a safe driving score for an autonomous vehicle driving system by autonomous vehicle driving system safe driving score calculator 402 may be performed during one, or combination of, virtual test track, closed test track, and live test track conditions. Such a safe driving score calculated under such conditions may serve as a baseline and/or benchmark for determining insurance plans in response to the safe driving score generated in live-driving instances.

In other embodiments, further paradigms of testing may be considered including load tests, functional tests, and security and/or penetration tests in order to generate a safe driving score. Additionally, other types of testing may be performed. For example, tests may be performed that consider vehicle response to failure of internal and external driving components (e.g., sensors 211 and 221, telematics devices 213 and 223, external computing device 230, driving analysis server 250, etc.)

Figure 5:
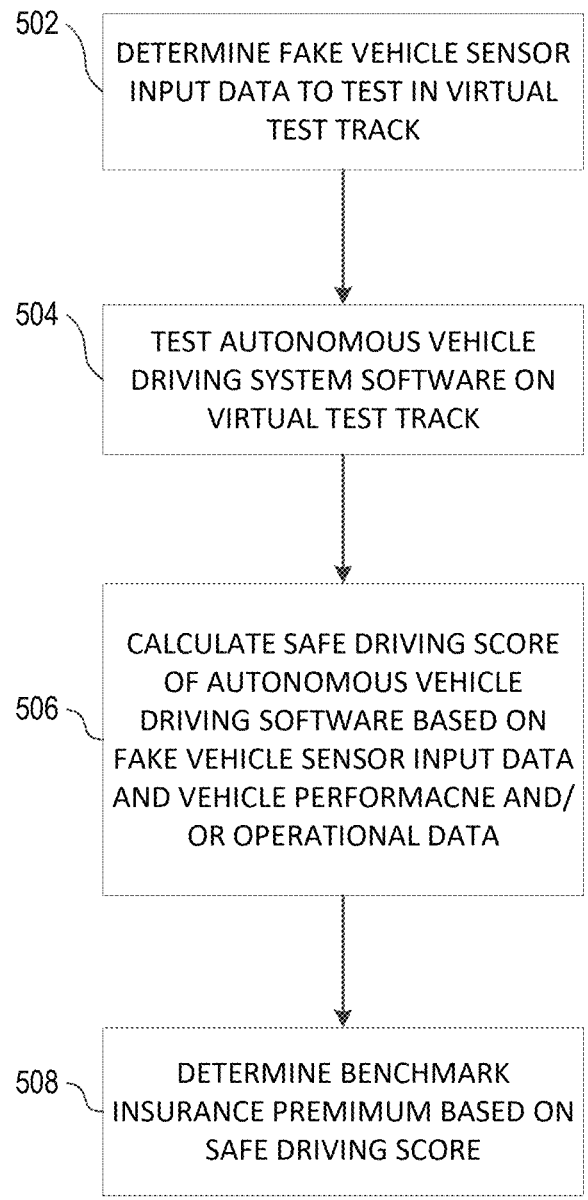
FIG. 5 is a flow diagram illustrating an example method of determining a safe driving score for an autonomous vehicle during testing in a virtual test track according to one or more aspects of the disclosure.

FIG. 5 is a flow diagram illustrating an example method of determining a safe driving score for an autonomous vehicle during testing in a virtual test track according to one or more aspects of the disclosure. The steps illustrated in FIG. 5 may be performed by one or more computing devices 101. For example, a vehicle computing device (e.g., driving analysis computers 214 and 224, vehicle control computers 217 and 227) and/or a driving analysis computing device (e.g., mobile computing devices 215 and 225, telematics devices 213, and 223, driving analysis server 250, external computing device 230) may perform one or more of the steps illustrated in FIG. 5.

As described in further detail below, a virtual test track may refer to a software-based autonomous vehicle driving system testing arrangement. Such a virtual test track may be a computing device similar to that of computing device 101 and may be further configured to virtually stress test logical aspects of an autonomous vehicle driving system by simulating driving conditions potentially encounterable in a live-driving scenario through the controlled presentation of fake vehicle sensor input data.

At step 502, the fake vehicle sensor input data (e.g., virtual test track testing parameters) may be determined for a particular virtual test track stress testing scenario. The fake vehicle sensor input data may be determined in order to test any one of a plurality of potentially encounterable live-driving scenarios. For example, determined fake vehicle sensor input data may be representative of blizzard conditions, at nightfall, on icy roads, on a mountain road. Such circumstances only serve as a non-limiting, illustrative example, wherein it will be readily appreciated that a plurality of other driving circumstances may be tested.

In certain embodiments, a standardized and predetermined number of potentially encounterable live-driving scenarios may be complied into a virtual test track gauntlet. Accordingly, the virtual test track gauntlet may serve as a standardized test administered to autonomous vehicle driving systems produced by different software providers and/or developers. In certain embodiments, the virtual test track gauntlet may be updated on a year-by-year basis. In such embodiments, autonomous vehicle driving systems may be required to take the virtual test track gauntlet yearly and achieve a predetermined safe driving score in order to be deemed insurable.

In other instances, fake vehicle sensor input data may be determined for the totality of potentially encounterable live-driving scenarios. Such fake vehicle sensor input data may be utilized to test autonomous vehicle driving systems in the virtual test track for every such scenario.

At step 504, after determining fake vehicle sensor input data, logical infrastructure of an autonomous vehicle driving system may be tested on the virtual test track. During testing, fake vehicle sensor input data may be presented to the autonomous vehicle driving system which, in turn, exhibits virtual driving responses in the form of vehicle performance and/or operational data to such fake vehicle sensor inputs.

In some embodiments, the fake vehicle sensor input presented to the autonomous vehicle driving system may comprise a first scenario of a number of scenarios tested in a virtual test track gauntlet. The quantity and type of fake vehicle sensor input data presented to the autonomous vehicle driving system may increase and vary as virtual testing scenarios are performed and passed. In such a manner, the virtual test track gauntlet may increase in difficulty (e.g., processing complexity) as scenarios are completed. In other embodiments, the virtual test track gauntlet may include a standardized and predetermined number of administered testing scenarios exhibited randomly (e.g., processing complexity is not directly correlated to testing scenario number).

At step 506, a safe driving score is calculated by, for example, autonomous vehicle driving system safe driving score calculator 402, for the autonomous vehicle driving system. The autonomous vehicle driving system safe driving score calculator 402 may be comprised in a vehicle computing device (e.g., driving analysis computers 214 and 224, vehicle control computers 217 and 227) and/or a driving analysis computing device (e.g., mobile computing devices 215 and 225, telematics devices 213, and 223, driving analysis server 250, external computing device 230). In some embodiments, autonomous vehicle driving system safe driving score calculator 402 may be included in the same device as that of the virtual test track arrangement.

The safe driving score may be calculated using algorithms that consider the fake vehicle sensor input data provided to the autonomous vehicle driving system, as well as the vehicle performance and/or operational data exhibited by the autonomous vehicle driving system in response to the fake vehicle sensor input data. The algorithms used to calculate the safe driving score may also consider additional data. As stated above in regards to FIG. 4, the safe driving score may serve as a marker of safe driving behavior of the autonomous vehicle driving software.

In some embodiments, the safe driving score may represent a first grade of a first scenario for the autonomous vehicle driving software. As stated above, a virtual test track gauntlet may include a number of standardized and predetermined scenarios. In order for the autonomous vehicle driving system software to be eligible to proceed to a second scenario of the virtual test track gauntlet, the first grade may be required to be of a certain safe driving score (e.g., between 60-100). In the manner described above, the autonomous vehicle driving software may be required to achieve a certain safe driving score for each testing scenario in order to traverse the virtual testing gauntlet. In other embodiments, the autonomous vehicle driving software may only be required to achieve a certain safe driving score for a certain number of testing scenarios in the virtual testing gauntlet (e.g., to achieve a safe driving score between 60-100 for 90% of testing scenarios administered).

At step 508, a benchmark and/or baseline insurance premium and/or deductible may be determined based on the safe driving score. In some embodiments, the benchmark insurance premium and/or deductible may be determined based upon a correlation between the safe driving score determined in step 506 and a safe driving score known to be indicative of a human safe driver as described in FIG. 3. For example, the safe driving score indicative of a human safe driver may be weighted, and may fall, as weighted, between a range of 90-100. The safe driving score may be utilized to determine a cost of a first insurance plan and/or deductible for the driver achieving the safe driving score. The safe driving score calculated for the autonomous vehicle driving system software may be weighted, and may fall, as weighted, anywhere between 0-100. Depending on the correlation between the safe driving score and the safe driving score calculated responsive to performance in the virtual test track, a comparable insurance premium and/or deductible cost may be determined and/or awarded for an entity associated with the autonomous vehicle driving system. For example, if a driver achieving a safe driving score between 90-100 pays $20/month in insurance premiums and/or has a deductible of $1,000, an entity associated with the autonomous vehicle driving system software (e.g., software provider and/or developer, autonomous vehicle manufacturer, owner of the autonomous vehicle) may also be required to pay $20/month in premiums and/or a $1,000 deductible if the autonomous vehicle driving software also achieves a safe driving score between 90-100. However, if the autonomous vehicle driving software achieves a safe driving score between 80-90, an entity associated with the autonomous vehicle driving software and/or autonomous vehicle using the autonomous vehicle driving software may be required to pay $40/month in insurance premiums and/or a $1,200 deductible.

Such a determined benchmark and/or insurance premium and/or deductible may serve as an entry point from which insurance prices for autonomous vehicle driving systems can fluctuate. For example, if the autonomous vehicle driving system that achieved a safe driving score between 80-90 is subsequently determined to improve its safe driving score to the 90-100 range while driving in the real world, the insurance premium and/or deductible associated with the autonomous vehicle driving system may decrease in price. Alternatively, if the safe driving score is determined to drop (e.g., to the 70-80 range) the cost of the insurance premium and/or deductible may rise.

In other embodiments, steps 502-506 may be performed iteratively for the total number of standardized and predetermined scenarios included in the virtual test track gauntlet. For each iteration performed, a safe driving score may be determined. Upon completion of the total number of standardized and predetermined scenarios included in the virtual test track gauntlet, an average safe driving score may be calculated. The calculated average safe driving score may be compared in the manner described above to a safe driving score indicative of a human safe driver in order to generate and/or award an insurance premium and/or deductible of a certain cost relative to that of the insured driver.

Figure 6:
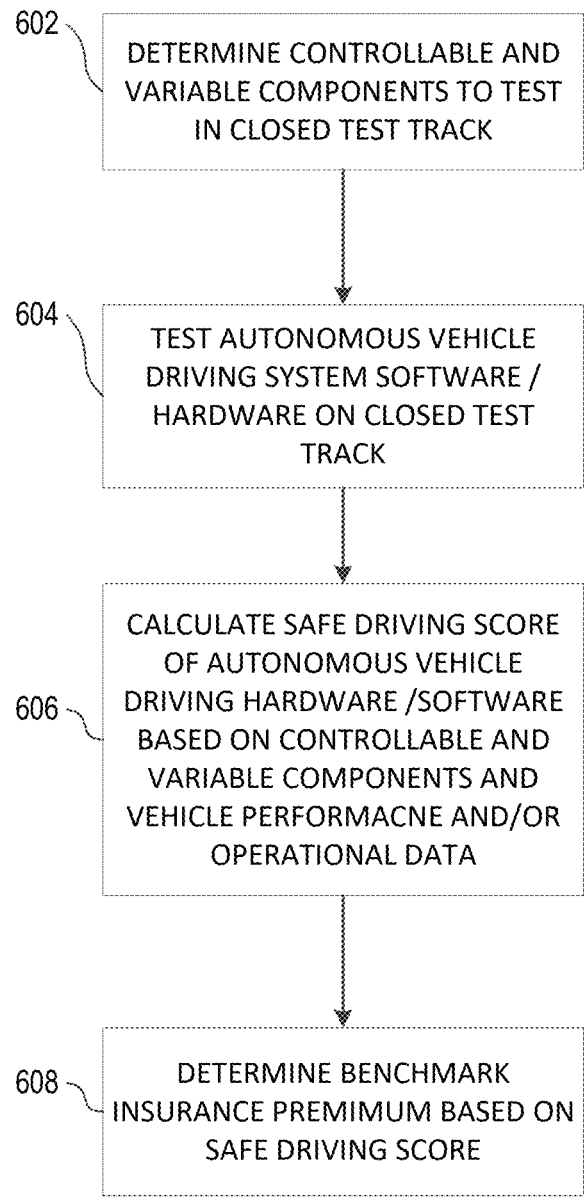
FIG. 6 is a flow diagram illustrating an example method of determining a safe driving score for an autonomous vehicle during testing in a closed test track according to one or more aspects of the disclosure.

FIG. 6 is a flow diagram illustrating an example method of determining a safe driving score for an autonomous vehicle during testing in a closed test track according to one or more aspects of the disclosure. In certain embodiments, autonomous vehicle driving system testing under closed test track conditions is performed as a progression from virtual test track testing described in FIG. 5. In such embodiments, an autonomous vehicle driving system may be required to achieve a passing grade in the virtual test track in order to be able to progress to testing in the closed test track, wherein a passing grade is a safe driving score of a certain standardized and predetermined number and/or range (e.g., 50-100, 65-100, etc.). In other embodiments, autonomous vehicle driving system testing under closed test track conditions is performed independently from that of the virtual test track testing.

As described in further detail in regards to FIG. 6, a closed test track may entail a standardized and predetermined physical test course including controllable and variable components configured to interact and/or interfere with an autonomous vehicle. Through interaction with the controllable and variable components, the autonomous vehicle may exhibit certain vehicular responses with associated vehicle performance and/or operational data. The autonomous vehicle may be similar to that of autonomous vehicles 210 and 220 and may include the autonomous vehicle drive system logical components as described in regards to FIG. 5. The controllable and variable components may include sprinklers, strobe lights, sirens, snow machines, wind generators, movable carts, movable walls, cones, roads of varying type and quality, and the like. Such controllable and variable components may be activated in a standardized and predetermined manner in order to engage the participating autonomous vehicle.

In certain embodiments where the autonomous vehicle is considered to be a hardware item and the autonomous vehicle driving system software is considered to be a software item operating on the hardware, the closed test track described in FIG. 6 may enable compatibility testing between hardware and software components. For example, if vehicle manufacturer A produces an autonomous vehicle capable of accepting a number of different autonomous vehicle driving software systems, and autonomous vehicle driving system software company B produces autonomous vehicle driving system software capable of operating on a multitude of hardware systems, compatibility between the hardware and software systems may be explored through closed test track testing.

In such embodiments where an autonomous vehicle is operated by software not produced by the autonomous vehicle manufacturer, the premium and/or deductible costs determined in regards to the steps described below in regards to FIG. 6 may be split between the autonomous vehicle manufacturer and the autonomous vehicle driving system software provider.

At step 602, the controllable and variable components (e.g., closed test track testing parameters) may be determined for a particular closed test track stress testing scenario. The controllable and variable components may be determined in order to test any one of a plurality of potentially encounterable live-driving scenarios. For example, controllable and variable components may be representative of heavy rainfall, with gusting winds, on a sinusoidal shaped gravel road with pot holes. Such circumstances only serve as one non-limiting, illustrative example, wherein it will be readily appreciated that a plurality of other driving circumstances may be tested.

In certain embodiments, a standardized and predetermined number of potentially encounterable live-driving scenarios may be included in a closed test track gauntlet. Accordingly, the closed test track gauntlet may serve as a standardized test administered to autonomous vehicle driving systems produced by different vehicle manufactures and/or software providers. In certain embodiments, the closed test track gauntlet may be updated on a year-by-year basis. In such embodiments, autonomous vehicle driving systems may be required to take the closed test track gauntlet yearly and achieve a predetermined safe driving score in order to be deemed insurable. Controllable and variable components for such standardized and predetermined live-driving scenarios may be determined. As will be described in further detail below, software and hardware responses of an autonomous vehicle driving system may be tested by each of the number of scenarios included in the closed test track gauntlet.

At step 604, after determining controllable and variable components, software and hardware of autonomous vehicle driving system may be tested on the closed test track. During testing, controllable and variable components may be presented to the autonomous vehicle driving system which, in turn, exhibits driving responses quantified by vehicle performance and/or operational data to such controllable and variable components.

In some embodiments, the controllable and variable components presented to the autonomous vehicle driving system may be part of a first scenario of a number of scenarios tested in a closed test track gauntlet. The quantity and type of controllable and variable components presented to the autonomous vehicle driving system may increase and vary as closed testing scenarios are performed and passed. In such a manner, the closed test track gauntlet may increase in difficulty as scenarios are completed. In other embodiments, the closed test track gauntlet may include a standardized and predetermined number of administered testing scenarios exhibited randomly.

At step 606, a safe driving score is calculated by, for example, autonomous vehicle driving system safe driving score calculator 402, for the autonomous vehicle driving system. The autonomous vehicle driving system safe driving score calculator 402 may be comprised in a vehicle computing device (e.g., driving analysis computers 214 and 224, vehicle control computers 217 and 227) and/or a driving analysis computing device (e.g., mobile computing devices 215 and 225, telematics devices 213, and 223, driving analysis server 250, external computing device 230).

The safe driving score may be calculated using algorithms that consider the controllable and variable components imparted onto the autonomous vehicle driving system, as well as the vehicle performance and/or operational data exhibited in response to the controllable and variable components. As stated above in regards to FIG. 4, the safe driving score may serve as a marker of safe driving behavior of autonomous vehicle driving system.

In some embodiments, the safe driving score may represent a first grade of a first scenario for the autonomous vehicle driving system. As stated above, a closed test track gauntlet may include a number of standardized and predetermined scenarios. In order for the autonomous vehicle driving system software to be eligible to proceed to a second scenario of the closed test track gauntlet, the first grade may be required to be of a certain safe driving score (e.g., between 60-100). In the manner described above, the autonomous vehicle driving system may be required to achieve a certain safe driving score for each testing scenario in order to traverse the closed test track testing gauntlet. In other embodiments, the autonomous vehicle driving software may only be required to achieve a certain safe driving score for a certain number of testing scenarios in the closed test track testing gauntlet (e.g., to achieve a safe driving score between 60-100 for 90% of testing scenarios administered).

At step 608, a benchmark and/or baseline insurance premium and/or deductible may be determined based on the safe driving score. In some embodiments, the benchmark insurance premium and/or deductible may be determined based upon a correlation between the safe driving score determined in step 606 and a safe driving score known to be indicative of a human safe driver as described in FIG. 3. For example, the safe driving score indicative of a human safe driver may be weighted, and may fall, as weighted, between a score of 90-100. The safe driving score may be utilized to determine cost of a first insurance plan for the driver achieving the safe driving score. The safe driving score calculated for the autonomous vehicle driving system may be weighted, and may fall, as weighted, anywhere between 0-100. Depending on the correlation between the safe driving score and the safe driving score calculated responsive to performance in the closed test track, a comparable insurance premium and/or deductible cost may be determined and/or awarded for an entity associated with the autonomous vehicle driving system. As stated above, such a determined benchmark and/or baseline insurance premium and/or deductible may establish a point from which insurance prices can fluctuate.

In other embodiments, steps 602-606 may be performed iteratively for the total number of standardized and predetermined scenarios included in the closed test track gauntlet. For each iteration performed, a safe driving score may be determined. Upon completion of the total number of standardized and predetermined scenarios included in the closed test track gauntlet, an average safe driving score may be calculated. The calculated average safe driving score may be compared in the manner described above to a safe driving score indicative of a live-driving safe driver in order to generate and/or award an insurance premium and/or deductible of a certain cost relative to that of the insured driver.

In some embodiments, the average safe driving score calculated responsive to an autonomous vehicle driving system completing the closed test track gauntlet may be further averaged with t the average safe driving score determined during traversal of the virtual test track gauntlet. Such a combined safe driving score may be compared in the manner described above to the safe driving score. In some instances, an autonomous vehicle driving system may only be able to pass to the open test track testing upon exhibiting safe driving behavior and, by extension, a safe driving score comparable to that of a live-driving safe driver, e.g., with a safe driving score between 90-100.

Figure 7:
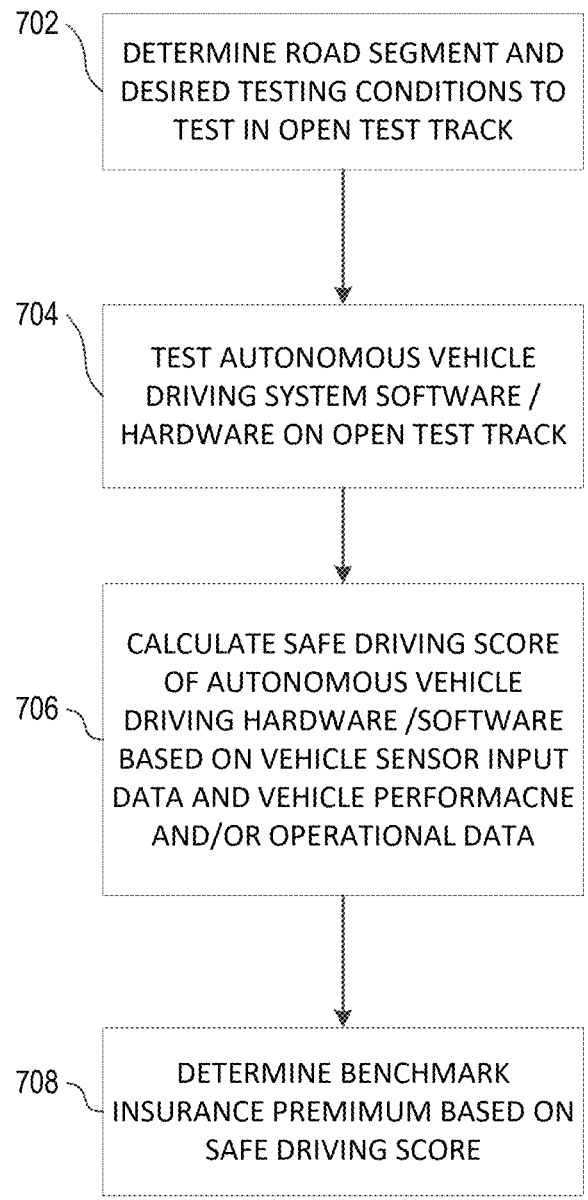
FIG. 7 is a flow diagram illustrating an example method of determining a safe driving score for an autonomous vehicle during testing in an open test track according to one or more aspects of the disclosure.

FIG. 7 is a flow diagram illustrating an example method of determining a safe driving score for an autonomous vehicle during testing in an open test track according to one or more aspects of the disclosure. An open test track may entail a real segment of open roadway used as a final setting for testing an autonomous vehicle. The autonomous vehicle described in FIG. 7 may be similar to that of autonomous vehicles 210 and 220 and may include the autonomous vehicle drive system as described herein.

At step 702, the road segment and desired testing conditions (e.g., open test track testing parameters) may be determined for an open test track testing scenario. The road segment and desired testing conditions may be determined in order to test real driving scenarios. For example, the road segment and desired testing conditions may entail a specific portion of road during a thunderstorm at evening during rush hour. Such circumstances only serve as one non-limiting, illustrative example, wherein it will be readily appreciated that a plurality of other driving circumstances may be tested.

In certain embodiments, multiple road segments with varying driving conditions may be compiled into an open test track gauntlet. Accordingly, the open test track gauntlet may serve as a standardized test administered to autonomous vehicle driving systems produced by different vehicle manufactures and/or software providers. In certain embodiments, the open test track gauntlet may be updated on a year-by-year basis. In such embodiments, autonomous vehicle driving systems may be required to take the open test track gauntlet yearly and achieve a predetermined safe driving score in order to be deemed insurable. As will be described in further detail below, software and hardware responses of an autonomous vehicle driving system may be tested at each road segment under the varying driving conditions included in the open test track gauntlet.

At step 704, after determining the road segments and desired driving conditions, software and hardware of autonomous vehicle driving system may be tested on the open test track. In instances where certain uncontrollable weather conditions are called for, autonomous vehicle testing may be delayed until such conditions become present. During testing, the autonomous vehicle driving system may be allowed to freely drive on the chosen segment of open road under the determined driving conditions. In turn, the autonomous vehicle driving systems are monitored for driving responses in response to randomly encountered driving scenarios (i.e., swerving drivers, pedestrians crossing the street, and the like). In open test track conditions, both sensor input data registering such random driving scenarios and vehicle performance and/or operational data in response to such random driving scenarios are determined. In some embodiments, road segment and associated driving conditions may comprise a first trial of a plurality trails wherein each trial of the plurality of trials comprises different segments of open road under different conditions. The totality of trials may be comprised in an open test track gauntlet.

In other embodiments, a specific road segment may be determined for open road testing. The autonomous vehicle driving system may be tested in a plurality of real-driving iterations on the specific road segment under varying accompanying driving conditions. Such an open test track testing design may serve as an alternative open test track gauntlet.

At step 706, a safe driving score is calculated by, for example, autonomous vehicle driving system safe driving score calculator 402, for the autonomous vehicle driving system. The autonomous vehicle driving system safe driving score calculator 402 may be comprised in a vehicle computing device (e.g., driving analysis computers 214 and 224, vehicle control computers 217 and 227) and/or a driving analysis computing device (e.g., mobile computing devices 215 and 225, telematics devices 213, and 223, driving analysis server 250, external computing device 230).

The safe driving score may be calculated using algorithms that consider the vehicle sensor input data and vehicle performance and/or operational data exhibited in response to the experienced driving phenomena. As stated above in regards to FIG. 4 and FIG. 5, the safe driving score may serve as a marker of safe driving behavior of autonomous vehicle driving system. In some embodiments, the safe driving score may represent a first grade of a first trial of an autonomous vehicle driving system of a number of trails tested in an open test track gauntlet.

At step 708, a benchmark and/or baseline insurance premium and/or deductible may be determined based on the safe driving score. In some embodiments, the benchmark insurance premium and/or deductible may be determined based upon a correlation between the safe driving score determined in step 706 and a safe driving score known to be indicative of a safe human driver as described in FIG. 3. For example, the safe driving score indicative of a safe human driver may be weighted, and may fall, as weighted, between a score of 90-100. The safe driving score may be utilized to determine cost of a first insurance plan for the driver achieving the safe driving score. The safe driving score calculated for the autonomous vehicle driving system may be weighted, and may fall, as weighted, anywhere between 0-100. Depending on the correlation between the safe driving score and the safe driving score calculated responsive to performance in the open test track, a comparable insurance premium and/or deductible cost may be determined and/or awarded. As stated above, such a determined benchmark and/or baseline insurance premium and/or deductible may establish a point from which insurance prices can fluctuate.

In other embodiments, steps 702-706 may be performed iteratively for the total number of trials included in the open test track gauntlet. For each trial performed, a safe driving score may be determined. Upon completion of the total number of trials included in the open test track gauntlet, an average safe driving score may be calculated. The calculated average safe driving may be compared in the manner described above to a safe driving score indicative of a human safe driver in order to generate and/or award an insurance premium and/or deductible of a certain cost relative to that of the insured driver.

In some embodiments, the average safe driving score calculated responsive to an autonomous vehicle driving system completing the open test track gauntlet may be further averaged with that of the virtual test track gauntlet and closed test track gauntlet to determine a finalized safe driving score. Such a finalized safe driving score may be compared in the manner described above to the safe driving score. In some instances, an autonomous vehicle driving system will only be deemed insurable if a certain finalized safe driving score is achieved. In other instances, if a high finalized safe driving score is achieved (i.e., finalized safe driving score between 90-100) a gold seal of approval may be given to the autonomous vehicle driving system. Similarly, if a finalized safe driving score falls between 80-90, a silver seal of approval may be given. Lastly, if a finalized safe driving score falls between 70-80, a bronze seal of approval may be given. Such seals approval may serve as a marker of quality and reliability of an autonomous safe driving system. Furthermore, such seals may be directly linked to certain insurance rates.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory, computer-readable medium storing instructions that, when executed by at least one processor of a computing device, cause the computing device to perform the steps of:
    determining, by a driving analysis computing device, first testing input data representative of first vehicle sensor data;
    causing performance of a first test of an autonomous vehicle driving system by:

sending, to a vehicle computing device, the first testing input data; and receiving, from the vehicle computing device, first vehicle driving data representative of virtual driving responses generated in response to the first testing input data;

determining, based on the first testing input data and the first vehicle driving data, a first driving score for the autonomous vehicle driving system;

in response to the first driving score being above a predetermined threshold;

determining, by the driving analysis computing device, second testing input data representative of second vehicle sensor data;

cause performance of a second test of the autonomous vehicle driving system by:

activating at least one controllable and variable test component including at least one of: a sprinkler, a wind generator, a siren, a strobe light, a snow machine, a movable obstacle, a cone, or a type of road with a particular quality on a closed test track;

presenting, to a first vehicle comprising the vehicle computing device, the second testing input data;

activating the autonomous driving system to physically maneuver the first vehicle through the activated at least one test component on the closed test track; and receiving, from the vehicle computing device, second vehicle driving data representative of actual driving responses generated in response to the second testing input data and the activated at least one test component;

determining, based on the second testing input data and the second vehicle driving data, a second driving score for the autonomous vehicle driving system;

determining, based on a safe driving score calculated based on the second driving score, a second benchmark insurance premium for the autonomous vehicle driving system; and applying, the second benchmark insurance premium to one or more insurance policies for one or more autonomous vehicles associated with the autonomous vehicle driving system.

2. The non-transitory, computer-readable of claim 1, wherein the first test is performed on a virtual testing track.

3. The non-transitory, computer-readable medium of claim 1, wherein the instructions, when executed by the at least one processor, further cause the computing device to perform the steps of:

determining, by the driving analysis computing device, third testing input data;

cause performance of a third test of the autonomous vehicle driving system by:

sending, to the vehicle computing device of the first vehicle, the third testing input data and instructions for the first vehicle to operate in accordance with the third testing input data; and receiving, from the vehicle computing device, third vehicle driving data representative of actual driving responses generated in response to the third testing input data;

determining, based on the third testing input data and the third vehicle driving data, a third driving score for the autonomous vehicle driving system; and determining, based on the third driving score, a third benchmark insurance premium for the autonomous vehicle driving system.

4. The non-transitory, computer-readable of claim 3, wherein the third test is performed on an open testing track, wherein the third testing input data comprises at least one of: a specific road segment, a predetermined time period, or one or more testing conditions, and wherein the instructions for the first vehicle to operate in accordance with the third testing input data comprise instructions for the first vehicle to drive on the specific road segment during the predetermined time period while testing the autonomous vehicle driving system during the third test.

5. The non-transitory, computer-readable medium of claim 3, wherein the instructions, when executed by the at least one processor, further cause the computing device to perform the steps of:

determining, based on one or more of: the first driving score, the second driving score, and third driving score, an average benchmark insurance premium for the autonomous vehicle driving system.

6. The non-transitory, computer-readable medium of claim 3, wherein the instructions, when executed by the at least one processor, cause the computing device to perform the steps of causing the performance of the second test based on the first driving score satisfying a first score threshold; and causing the performance of the third test based on the second driving score satisfying a second score threshold.

7. A computing device comprising:

at least one processor; and memory storing computer-readable instructions that, when executed by the at least one processor, cause the computing device to:

determine first testing input data representative of first vehicle sensor data;

cause performance of a first test of an autonomous vehicle driving system by:

sending, to a vehicle computing device, the first testing input data; and receiving, from the vehicle computing device, first vehicle driving data representative of virtual driving responses generated in response to the first testing input data;

determine, based on the first testing input data and the first vehicle driving data, a first driving score for the autonomous vehicle driving system;

in response to the first driving score being above a predetermined threshold:

determine second testing input data representative of second vehicle sensor data;

cause performance of a second test of the autonomous vehicle driving system by:

activating at least one controllable and variable test component including at least one of: a sprinkler, a wind generator, a siren, a strobe light, a snow machine, a movable obstacle, a cone, or a type of road with a particular quality on a closed test track;

presenting, to a first vehicle comprising the vehicle computing device, the second testing input data;

activating the autonomous driving system to physically maneuver the first vehicle through the activated at least one test component on the closed test track; and receiving, from the vehicle computing device, second vehicle driving data representative of actual driving responses generated in response to the second testing input data and the at least one test component;
determine, based on the second testing input data and the second vehicle driving data, a second driving score for the autonomous vehicle driving system; and
determine, based on a safe driving score calculated based on the second driving score, a second benchmark insurance premium for the autonomous vehicle driving system; and
apply the second benchmark insurance premium to one or more insurance policies for one or more autonomous vehicles associated with the autonomous vehicle driving system.

8. The computing device of claim 7, wherein the instructions, when executed by the at least one processor, further cause the computing device to:
determine third testing input data;
cause performance of a third test of the autonomous vehicle driving system by:
sending, to the vehicle computing device of the first vehicle, the third testing input data and instructions for the first vehicle to operate in accordance with the third testing input data; and
receiving, from the vehicle computing device, third vehicle driving data representative of actual driving responses generated in response to the third testing input data;
determine, based on the third testing input data and the third vehicle driving data, a third driving score for the autonomous vehicle driving system; and
determine, based on the third driving score, a third benchmark insurance premium for the autonomous vehicle driving system.

9. The computing device of claim 8, wherein the instructions, when executed by the at least one processor, further cause the computing device to:
determine, based on one or more of: the first driving score, the second driving score, and the third driving score, an average benchmark insurance premium for the autonomous vehicle driving system.

10. The computing device of claim 8, wherein the instructions, when executed by the at least one processor, cause the computing device to:
cause the performance of the second test based on the first driving score satisfying a first score threshold; and
cause the performance of the third test based on the second driving score satisfying a second score threshold.

11. The computing device of claim 8, wherein the first test is performed on a virtual testing track,
wherein the second test is performed on a closed testing track,
wherein the second testing input data comprises controllable and variable components,
wherein the third test is performed on an open testing track, and
wherein the third testing input data comprises at least one of: a specific road segment, a predetermined time period, or one or more testing conditions.

12. The computing device of claim 11, wherein the instructions for the first vehicle to operate in accordance with the third testing input data comprise instructions for the first vehicle to drive on the specific road segment during the predetermined time period while testing the autonomous vehicle driving system during the third test.

13. A system comprising:
a vehicle computing device associated with an autonomous vehicle driving system; and
a driving analysis computing device,
wherein the vehicle computing device is configured to:
receive, from the driving analysis computing device, first testing input data representative of first vehicle sensor data;
simulate operation of a vehicle in accordance with the first testing input data;
generate first vehicle driving data representative of virtual driving responses to the first testing input data; and
send, to the driving analysis computing device, the first vehicle driving data, and wherein the driving analysis computing device is configured to:
determine the first testing input data representative of vehicle sensor data;
cause performance of a first test of the autonomous vehicle driving system by:
sending, to the vehicle computing device, the first testing input data; and
receiving, from the vehicle computing device, the first vehicle driving data representative of virtual driving responses;
determine, based on the first testing input data and the first vehicle driving data, a first driving score for the autonomous vehicle driving system;
in response to the first driving score being above a predetermined threshold:
determine second testing input data representative of second vehicle sensor data;
cause performance of a second test of the autonomous vehicle driving system by:
activating at least one controllable and variable test component including at least one of: a sprinkler, a wind generator, a siren, a strobe light, a snow machine, a movable obstacle, a cone, or a type of road with a particular quality on a closed test track;
presenting, to a first vehicle comprising the vehicle computing device, the second testing input data;
activating the autonomous driving system to physically maneuver the first vehicle through the activated at least one test component on the closed test track; and
receiving, from the vehicle computing device, second vehicle driving data representative of actual driving responses generated in response to the second testing input data and the activated at least one test component;
determine, based on the second testing input data and the second vehicle driving data, a second driving score for the autonomous vehicle driving system; and
determine, based on a safe driving score calculated based on the second driving score, a second benchmark insurance premium for the autonomous vehicle driving system; and
apply the second benchmark insurance premium to one or more insurance policies for one or more autonomous vehicles associated with the autonomous vehicle driving system.

14. The system of claim 13, wherein the driving analysis computing device is further configured to:

output, to a display device and based on the first testing input data and the first vehicle driving data, a risk map associated with the first test.

15. The system of claim 13, wherein the driving analysis computing device is further configured to:
determine third testing input data;
cause performance of a third test of the autonomous vehicle driving system by:
sending, to the vehicle computing device of the first vehicle, the third testing input data and instructions for the first vehicle to operate in accordance with the third testing input data; and
receiving, from the vehicle computing device, third vehicle driving data representative of actual driving responses generated in response to the third testing input data;
determine, based on the third testing input data and the third vehicle driving data, a third driving score for the autonomous vehicle driving system; and
determine, based on the third driving score, a third benchmark insurance premium for the autonomous vehicle driving system.

16. The system of claim 15, wherein the driving analysis computing device is further configured to:
determine, based on one or more of: the first driving score, the second driving score, and the third driving score, an average benchmark insurance premium for the autonomous vehicle driving system.

* * * * *